US00RE39512E

(19) United States
(12) Reissued Patent
Younker

(10) Patent Number: US RE39,512 E
(45) Date of Reissued Patent: Mar. 13, 2007

(54) POOL TABLE DECORATIVE LIGHT

(76) Inventor: Clayton R. Younker, Rte. 2 Box 50, Noel, MO (US) 64854

(21) Appl. No.: 10/720,008

(22) Filed: Nov. 21, 2003

Related U.S. Patent Documents

Reissue of:
(64) Patent No.: 6,328,461
Issued: Dec. 11, 2001
Appl. No.: 09/552,834
Filed: Apr. 20, 2000

(51) Int. Cl.
*F21V 1/22* (2006.01)
*F21V 21/008* (2006.01)

(52) U.S. Cl. ..... 362/433; 362/404; 362/408; 206/223; 206/575

(58) Field of Classification Search ..... 362/223, 362/224, 253, 260, 351, 360, 404, 406, 407, 362/408, 433, 808; 206/223, 575; 446/93–95, 446/88, 160, 230, 231, 438, 485; 473/1, 2; 40/556, 558, 564, 572; D26/24, 28, 72, 73, D26/75, 85, 88
See application file for complete search history.

(56) References Cited

U.S. PATENT DOCUMENTS

D152,390 S * 1/1949 Brenner ..... D26/97
3,760,179 A * 9/1973 Addington, Jr. ..... 362/576
3,783,544 A * 1/1974 Brody ..... 40/716
3,917,264 A * 11/1975 Davidson et al. ..... 473/2
4,029,313 A * 6/1977 Angulo ..... 473/1
D268,940 S * 5/1983 Head ..... D21/550
4,696,400 A * 9/1987 Warman ..... 206/575
4,882,676 A * 11/1989 Van De Kop et al. ..... 473/2
D308,113 S * 5/1990 Lewis, Jr. ..... D26/73
5,188,449 A * 2/1993 Davis et al. ..... 362/404
5,274,938 A * 1/1994 McDonald et al. ..... 40/617
5,352,147 A * 10/1994 Nagel et al. ..... 446/485
D374,293 S * 10/1996 Streger et al. ..... D26/25
5,791,775 A * 8/1998 Douglass, II ..... 362/404
5,989,098 A * 11/1999 Reynolds et al. ..... 446/485
6,112,887 A * 9/2000 Harrison ..... 206/87
6,158,157 A * 12/2000 Hiscock et al. ..... 40/661.01

* cited by examiner

*Primary Examiner*—Alan Cariaso
(74) *Attorney, Agent, or Firm*—James H. Marsh, Jr.; Stinson Morrison Hecker LLP

(57) ABSTRACT

A pool table decorative light for directing light toward a pool table and covering a light assembly. The pool table decorative light includes a light housing, the light housing has an open bottom side such that an interior and exterior of the light housing are defined. The light housing has a shape generally resembling a car. The light housing has a pair of openings therein such that each of the cables holding a light assembly may extend through one of the openings such that the light housing may be positioned between the light assembly and the ceiling. A plurality of accessories may be used for individually decorating an exterior surface of the light housing.

48 Claims, 2 Drawing Sheets

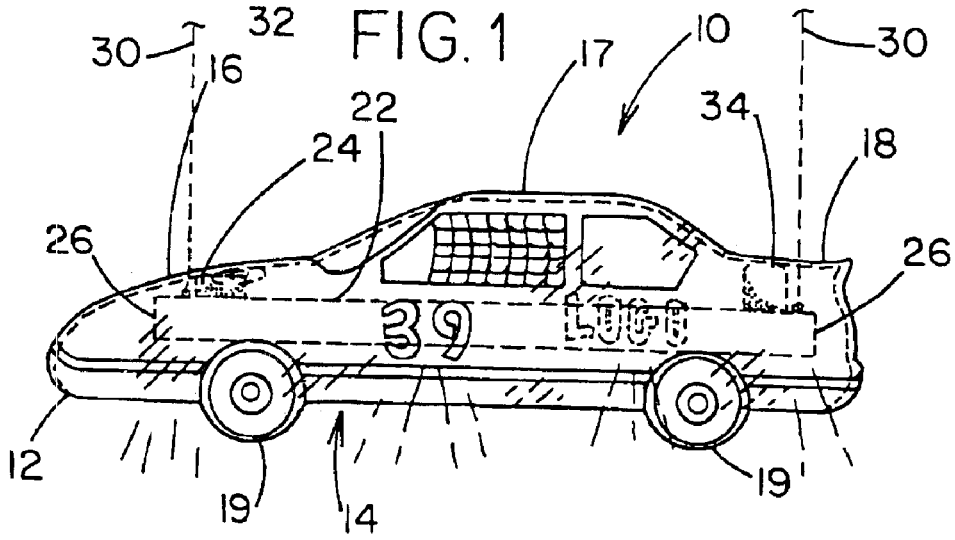
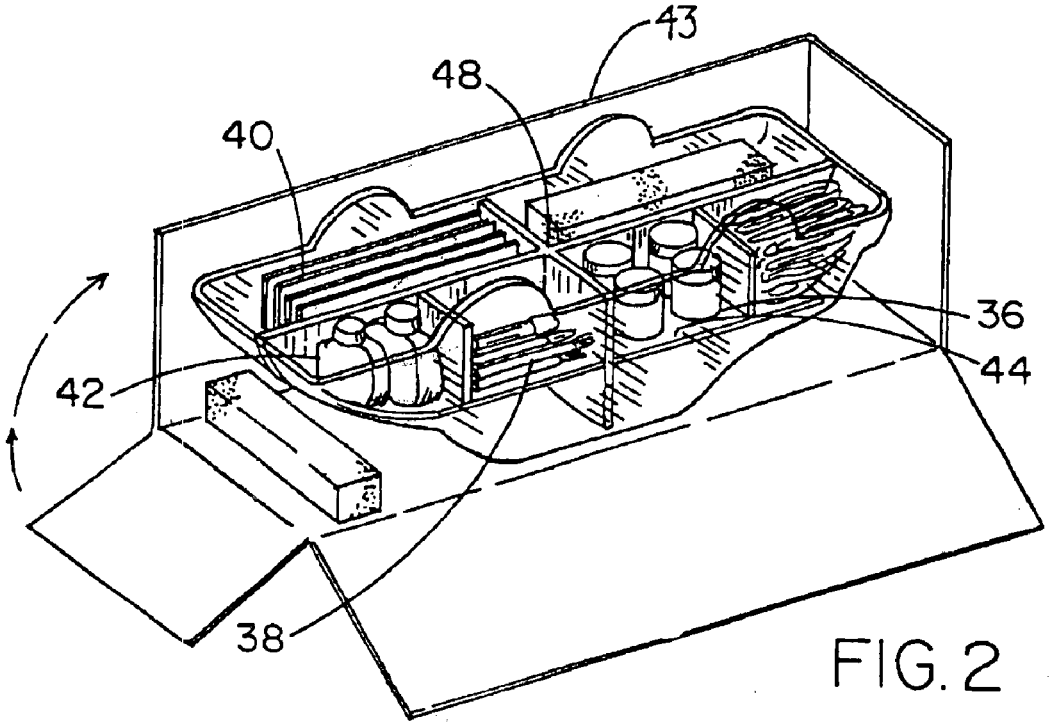
FIG. 2

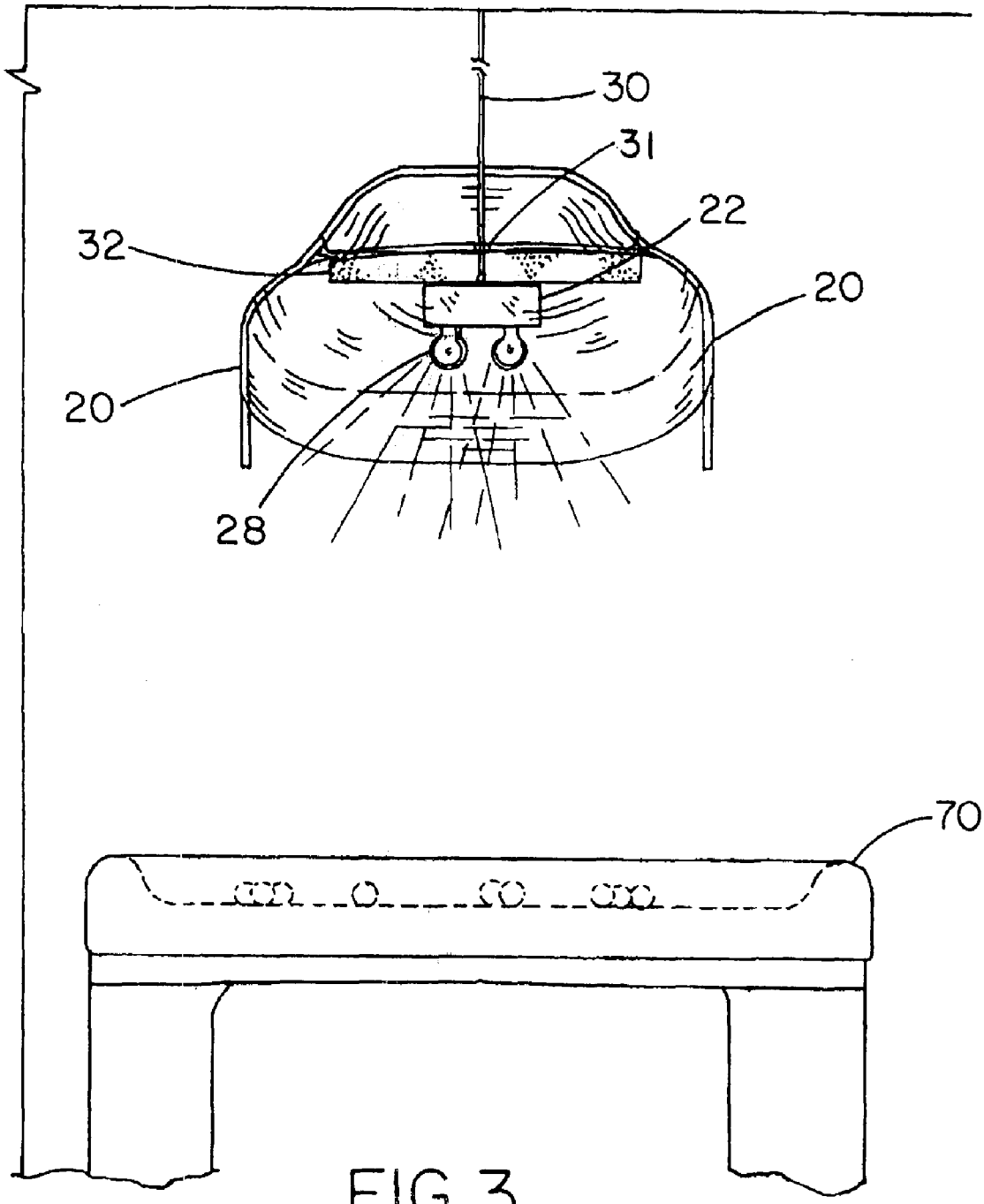
FIG. 3
(AMENDED)

POOL TABLE DECORATIVE LIGHT

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to pool table lights and more particularly pertains to a new pool table decorative light for directing light toward a pool table and covering a light assembly.

2. Description of the Prior Art

The use of pool table lights is known in the prior art. More specifically, pool table lights heretofore devised and utilized are known to consist basically of familiar, expected and obvious structural configurations, notwithstanding the myriad of designs encompassed by the crowded prior art which may been developed for the fulfillment of countless objectives and requirements.

Known prior art includes U.S. Pat. Nos. 3,783,544; 4,029,313; 3,760,179; U.S. Des. Pat. No. 268,940; U.S. Des. Pat. No. 152,309; and U.S. Des. Pat. No. 374,293.

While these devices fulfill their respective, particular objectives and requirements, the aforementioned patients do not disclose a new pool table decorative light. The inventive device includes a light housing, the light housing has an open bottom side such that an interior and exterior of the light housing are defined. The light housing has a shape generally resembling a car. The light housing has a pair of openings therein such that each of the cables holding a light assembly may extend through one of the openings such that the light housing may be positioned between the light assembly and the ceiling. A plurality of accessories may be used for individually decorating an exterior surface of the light housing.

In these respects, the pool table decorative light according to the present invention substantially departs from the conventional concepts and designs of the prior art and in so during provides an apparatus primarily developed for the purpose of directing light toward a pool table and covering a light assembly.

SUMMARY OF THE INVENTION

In view of the foregoing disadvantages inherent in the know types of pool table light now present in the prior art, the present invention provides a new pool table decorative light construction wherein the same can be utilized for directing light toward a pool table and covering a light assembly.

The general purpose of the present invention, which will be described subsequently in greater detail, is to provide a new pool table decorative light apparatus and method which has many of the advantages of the pool table light mentioned heretofore and many novel features that result in a new pool table decorative light which is not anticipated, rendered obvious, suggested, or even implied by any of the prior art pool table lights, either alone or in any combination thereof.

To attain this, the present invention generally comprises a light housing, the light housing has an open bottom side such that an interior and exterior of the light housing are defined. The light housing has a shape generally resembling a car. The light housing has a pair of openings therein such that each of the cables holding a light assembly may extend through one of the openings such that the light housing may be positioned between the light assembly and the ceiling. A plurality of accessories may be used for individually decorating an exterior surface of the light housing.

There has thus been outlined, rather broadly, the more important features of the invention in order that the detailed description thereof that followers may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal items or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new pool table decorative light apparatus and method which has many of the advantages of the pool table lights mentioned heretofore and many novel features that result in a new pool table decorative light which is not anticipated, rendered obvious, suggested, or even implied by any of the prior art pool table lights, either alone or in any combination thereof.

It is another object of the present invention to provide a new pool table decorative light which may be easily and efficiently manufactured and marketed.

It is a further object of the present invention to provide a new pool table decorative light which is of a durable and reliable construction.

An even further object of the present invention is to provide a new pool table decorative light which is susceptible to a low cost of manufacture with regard to both materials and labor, and which accordingly is then susceptible of low prices of sale to the consuming public, thereby making such pool table decorative light economically available to the buying public.

Still yet another object of the present invention is to provide a new pool table decorative light which provides in the apparatuses and methods of the prior art some of the advantages thereof, while simultaneously overcoming some of the disadvantages normally associated therewith.

Still another object of the present invention is to provide a new pool table decorative light for directing light toward a pool table and covering a light assembly.

Yet another object of the present invention is to provide a new pool table decorative light which includes a light housing, the light housing has an open bottom side such that an interior and exterior of the light housing are defined. The light housing has a shape generally resembling a car. The light housing has a pair of openings therein such that each of the cables holding a light assembly may extend through one of the openings such that the light housing may be positioned between the light assembly and the ceiling. A plurality of accessories may be used for individually decorating an exterior surface of the light housing.

Still yet another object of the present invention is to provide a new pool table decorative light that may be customized for the surroundings in which it is to be located.

Even still another object of the present invention is to provide a new pool table decorative light that may be painted such that light does not escape through the light housing.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic side view of a new pool table decorative light according to the present invention.

FIG. 2 is a schematic perspective view of the present invention.

FIG. 3 is a schematic front view of the present invention.

DESCRIPTION OF THE PREFERRED EMBODIMENT

With reference now to the drawings, and in particular to FIGS. 1 through 3 thereof, a new kit for decorating a pool table light embodying the principles and concepts of the present invention and generally designated by the reference numeral 10 will be described.

The decorative light kit 10 generally includes a container for holding a plurality of accessories to be used for decoration of an exterior surface of a light housing. The plurality of accessories may include paints, paint brushes, decals, and gluing means.

As best illustrated in FIGS. 1 through 3, the kit 10 for decorating a pool table light generally comprises a light housing 12. The light housing 12 has an open bottom side 14 such that an interior and exterior of the light housing are defined. The light housing 12 has a shape generally resembling a race car such that a hood portion 16, roof portion 17, trunk portion 18, four wheels 19 and two side walls 20 are defined. The light housing 12 is substantially transparent. The light housing 12 preferably comprises a material selected from the group consisting of plastic and fiberglass. The race car shape is generally that of race cars found in NASCAR or Indy car racing, through any type of car may be used. Thus, sports cars, or other classic cars may also be replicated.

The light housing 12 is mountable on a light assembly 22, which is elongate. The light assembly 22 has a top wall 24 and a pair of ends 26. The light assembly 22 is adapted to illuminate at least one elongated fluorescent light bulb 28. A pair of cables 30 hangs the light assembly 22 from the ceiling. Each of the cables 30 is coupled *to* the top wall 24 and each is positioned generally adjacent to an opposite end 26 of the top wall 24. The light assembly 22 is operatively coupled to a power source. The light housing 22 has a first opening[, not shown] *31* in the hood portion 16 and a *similar* second opening, not shown, in the trunk portion 18 such that each of the openings may receive one of the cables 30. The light assembly 22 may be any conventional hanging light fixture which is elongated to support the light housing 12 as the light housing 12 is placed between the ceiling and the light assembly 22.

A pair of spacing members 32, 34 place a portion of space between the interior surface of the light housing 12 and the light assembly 22. Each of the spacing members 32, 34 is positioned between the light assembly 22 and an interior surface of the light housing 12. A first 32 of the spacing members is between the top wall 24 of the light assembly 22 and the hood portion 16 of the light housing 12. A second 34 of the spacing members is positioned between the top wall 24 of the light assembly 22 and the trunk portion 18. Each of the spacing members 32, 34 comprises a block, which is comprised of a foamed plastic material, such as polystyrene. The blocks each have a size adopted to keep the light housing relatively level with the pool table 70.

A plurality of accessories may be used to individually decorate an exterior surface of the light housing. The plurality of accessories includes a plurality of paints 36. Each of the paints 36 has a different color. A portion of the paints 36 comprises spray paints. A plurality of paint brushes 38 may be used to add additional paint by hand.

A plurality of decals 40 may be placed on the light housing. Each of the decals 40 has a different indicia thereon. Each of the decals 40 is securable to an exterior surface of the light housing 12. The decals 40 may include numbers, advertising, tire decals for the tires or names of famous car drivers.

A gluing means 42 may be used for gluing items to the light housing. The gluing means comprises a conventional glue. The items may include names, numbers or advertising which is not represented by a decal.

A container 43 holds the accessories. The container has a base wall 44 having a top surface and a bottom surface. The top surface has a plurality of vertical walls 48 thereon such that a plurality of discrete sections are defined. Each of the discrete sections is adapted for holding a portion of the accessories. The container has a shape adapted for removably receiving in its interior the light housing 12, a relationship shown in FIG. 2.

In use, the user first paints the light housing 12 the color or colors desired. The decals 40 are then placed on the light housing as seen fit by the user. Once the light housing 12 is finished, it may be hung over the light assembly 22 which would then be coupled to the ceiling. Such lights are often found over pool tables 70.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A kit for decorating a light assembly, said light assembly being elongate, said light assembly having a top wall and a pair of ends, said light assembly illuminating a pair of elongated fluorescent light bulbs, said light assembly being hung from said ceiling by a pair of cables, each of said cables being coupled generally adjacent to an opposite end of said top wall, said light assembly being operatively coupled to a power source, said kit comprising:

a light housing, said light housing having an open bottom side such that an interior and exterior of said light housing are defined, said light housing having a shape generally resembling a car;

wherein said light housing has a pair of openings therein such that each of said cables may extend through one of said openings such that said light housing may be positioned between the light assembly and the ceiling;

a plurality of accessories for individually decorating an exterior surface of said light housing.

2. The kit as in claim 1, wherein said light housing further comprises:

said light housing resembling a race car, said light housing being substantially transparent, said light housing comprising a plastic.

3. The kit as in claim 2, further comprising:

a pair of spacing members for placing a space between the light assembly and said interior of said light housing, each of said spacing members being positioned between said light assembly and an interior surface of said light housing, a first of said spacing members being between said top wall of said light assembly and a hood portion of said light housing, a second of said spacing members being positioned between said top wall of said light assembly and a trunk portion.

4. The kit as in claim 1, wherein said plurality of accessories comprises:

a plurality of paints, each of said paints having a different color, a portion of said paints comprising spray paints.

5. The kit as in claim 4, wherein said plurality of accessories further comprises:

a plurality of paint brushes.

6. The kit as in claim 4, wherein said plurality of accessories further comprises:

a plurality of decals, each of said decals having a different indicia thereon, each of said decals being securable to an exterior surface of said light housing.

7. The kit as in claim 5, wherein said plurality of accessories further comprises:

a gluing means for gluing items to said light housing, said gluing means comprising a glue.

8. The kit as in claim 1, further comprising:

a container for holding said accessories, said container having a base wall having a top surface and a bottom surface, said top surface having a plurality of walls thereon such that a plurality of discrete sections are defined, each of said discrete sections being adapted for holding a portion of said accessories, said container having a shape adapted for being removably insertable in said interior of said light housing.

9. The kit as in claim 6, further comprising:

a container for holding said accessories, said container having a base wall having a top surface and a bottom surface, said top surface having a plurality of walls thereon such that a plurality of discrete sections are defined, each of said discrete sections being adapted for holding a portion of said accessories, said container having a shape adapted for being removably insertable in said interior of said light housing.

10. A kit for decorating a light assembly, said kit comprising:

a light housing, said light housing having an open bottom side such that an interior and exterior of said light housing are defined, said light housing having a shape generally resembling a race car such that a hood portion, roof portion, trunk portion and two sides walls are defined, said light housing being substantially transparent, said light housing comprising a material selected from the group consisting of a plastic and a fiberglass;

a light assembly, said light assembly being elongate, said light assembly having a top wall and a pair of ends, said light assembly illuminating a pair of elongated fluorescent light bulbs, said light assembly being hung from said ceiling by a pair of cables, each of said cables being coupled generally adjacent to an opposite end of said top wall, said light assembly being operatively coupled to a power source, wherein said light housing has a first opening in said hood portion and a second opening in said trunk portion such that each of said openings may receive one of said cables;

a pair of spacing members, each of said spacing members being positioned between said light assembly and an interior surface of said light housing, a first of said spacing members being between said top wall of said light assembly and said hood portion of said light housing, a second of said spacing members being positioned between said top wall of said light assembly and said trunk portion, each of said spacing members comprising a block, each of said blocks comprising a foamed plastic material;

a plurality of accessories for individually decorating an exterior surface of said light housing, said plurality of accessories comprising:

a plurality of paints, each of said pairs having a different color, a portion of said paints comprising spray paints;

a plurality of paint brushes;

a plurality of decals, each of said decals having a different indicia thereon, each of said decals being securable to an exterior surface of said light housing;

a gluing means for gluing items to said light housing, said gluing means comprising a glue; and a container for holding said accessories, said container having a base wall having a top surface and a bottom surface, said top surface having a plurality of walls thereon such that a plurality of discrete sections are defined, each of said discrete sections being adapted for holding a portion of said accessories, said container having a shape adapted for being removably insertable in said interior of said light housing.

11. A kit for decorating a light assembly, said light assembly being elongate, said light assembly having a top wall and a pair of ends, said light assembly being adapted for being hung from a ceiling by a pair of elongate members, said kit comprising:

a light housing having an open bottom side such that an interior and exterior of said light housing are defined, said light housing having a shape generally resembling a car;

wherein said light housing has a pair of openings therein such that each of said elongate members are extendable through one of said openings such that said light housing may be positioned between the light assembly and the ceiling;

a plurality of accessories for individually decorating an exterior surface of said light housing.

12. The kit as in claim 11, wherein said light housing is substantially transparent.

13. The kit as in claim 11, further comprising a pair of spacing members for spacing the light assembly from the interior of said light housing, each of said spacing members being positioned between said light assembly and an interior surface of said light housing, a first one of said spacing members being positionable between said top wall of said light assembly and a hood portion of said light housing, a second one of said spacing members being positionable between said top wall of said light assembly and a trunk portion.

14. The kit as in claim 11, wherein said plurality of accessories comprises a plurality of paints, each of said paints having a different color.

15. The kit as in claim 11, wherein said plurality of accessories further comprises a plurality of paint brushes.

16. The kit as in claim 11, wherein said plurality of accessories further comprises a plurality of decals, each of said decals having indicia marked thereon, each of said decals being securable to an exterior surface of said light housing.

17. The kit as in claim 11, wherein said plurality of accessories further comprises means for adhering items to said light housing.

18. The kit as in claim 11, further comprising a container for holding said accessories, said container having a base wall having a top surface and a bottom surface, said top surface having a plurality of walls thereon such that a plurality of discrete sections are defined, each of said discrete sections being adapted for holding a portion of said accessories, said container having a shape adapted for being removably insertable in said interior of said light housing.

*19. A housing arrangement for decorating a light assembly, said light assembly being elongated, said light assembly having a top wall and a pair of ends, said light assembly illuminating a pair of elongated fluorescent light bulbs, said light assembly being hung from a ceiling by a pair of cables, each of said cables being coupled generally adjacent to an opposite end of said top wall, said light assembly being operatively coupled to a power source, said housing arrangement comprising:*

*a light housing, said light housing having an open bottom side such that an interior and exterior of said light housing are defined, said light housing having a shape generally resembling a car,*

*wherein said light housing has a pair of openings therein such that each of said cables may extend through one of said openings such that said light housing may be positioned between the light assembly and the ceiling; and*

*a plurality of accessories individually decorating an exterior surface of said light housing.*

*20. The housing arrangement as in claim 19, wherein said light housing further comprises:*

*said light housing resembling a race car, said light housing being substantially transparent, said light housing comprising a plastic.*

*21. The housing arrangement as in claim 20, further comprising:*

*a pair of spacing members for placing a space between the light assembly and said interior of said light housing, each of said spacing members being positioned between said light assembly and an interior surface of said light housing, a first of said spacing members being between said top wall of said light assembly and a hood portion of said light housing, a second of said spacing members being positioned between said top wall of said light assembly and a trunk portion.*

*22. The housing arrangement as in claim 19, wherein said plurality of accessories comprises a plurality of decals, each of said decals having a different indicia thereon, each of said decals being secured to an exterior surface of said light housing.*

*23. A housing arrangement for decorating a light assembly, said light assembly being elongate, said light assembly having a top wall and a pair of ends, said light assembly being adapted for being hung from a ceiling by a pair of elongate members, said housing arrangement comprising:*

*a light housing having an open bottom side such that an interior and exterior of said light housing are defined, said light housing having a shape generally resembling a car;*

*wherein said light housing has a pair of openings therein such that each of said elongate members are extendable through one of said openings such that said light housing may be positioned between the light assembly and the ceiling;*

*a plurality of accessories individually decorating an exterior surface of said light housing.*

*24. The housing arrangement as in claim 23, wherein said light housing is substantially transparent.*

*25. The housing arrangement as in claim 23, further comprising a pair of spacing members for spacing the light assembly from the interior of said light housing, each of said spacing members being positioned between said light assembly and an interior surface of said light housing, a first one of said spacing members being positionable between said top wall of said light assembly and a hood portion of said light housing, a second one of said spacing members being positionable between said top wall of said light assembly and a trunk portion.*

*26. The housing arrangement as in claim 23, wherein said plurality of accessories comprises a plurality of decals, each of said decals having indicia marked thereon, each of said decals being secured to an exterior surface of said light housing.*

*27. A decorative housing arrangement for covering an elongated light assembly configured and arranged for hanging from an overhead structure using an elongated suspension member, said decorative light housing arrangement comprising:*

*a decorative housing having a shape generally resembling a car, said housing being configured and arranged for being supported by an upper surface area*

*of said light assembly with an upper portion of said housing disposed between the light assembly and said overhead structure, there being a suspension member accommodating opening in an upper surface of said housing; and*

*a plurality of decorating components carried on an outer surface of said decorative housing.*

*28. A decorative housing arrangement as set forth in claim 27, wherein said housing includes a depending skirt configured and arranged to surround said assembly when the housing is supported by the upper surface area of the assembly.*

*29. A decorative housing arrangement as set forth in claim 27, wherein said light assembly is configured and arranged for hanging from said overhead structure using a pair of spaced apart, elongated suspension members and said housing includes a pair of suspension member accommodating openings in an upper surface thereof.*

*30. A decorative housing arrangement as set forth in claim 27, wherein said decorating components include at least one decal that is secured to an exterior surface of said housing.*

*31. A decorative housing arrangement as set forth in claim 27, wherein said decorating components include a plurality of decals, at least one of said decals having a different indicia thereon than another of said decals, each of said decals being secured to an exterior surface of said housing.*

*32. A decorative housing arrangement as set forth in claim 27, wherein said decorating components include at least one indicia painted on an exterior surface of said light housing.*

*33. A decorative housing arrangement as set forth in claim 29, wherein said suspension members comprise cables.*

*34. A decorative housing arrangement as set forth in claim 27, wherein said light assembly comprises a fluorescent bulb.*

*35. A decorative housing arrangement as set forth in claim 27, wherein said overhead structure comprises a ceiling.*

*36. A decorative housing arrangement as set forth in claim 28, wherein said decorating components include a plurality of decals, at least one of said decals having a different indicia thereon than another of said decals, each of said decals being secured to an exterior surface of said skirt.*

*37. A decorated light assemblage comprising:*

*an elongated light assembly;*

*a pair of elongated suspension members attached to said light assembly at respective opposite ends thereof for hanging the assembly from an overhead structure;*

*a decorative housing having a shape generally resembling a car, said housing being supported by an upper surface area of said assembly with at least an upper portion of the housing disposed between the light assembly and said overhead structure; and*

*a plurality of decorating components carried on an outer surface of said decorative housing.*

*38. A decorated light assemblage as set forth in claim 37, wherein said housing includes a depending skirt configured and arranged in surrounding relationship relative to said assembly.*

*39. A decorated light assemblage as set forth in claim 37, wherein said housing includes a pair of suspension member accommodating openings in an upper surface thereof, said suspension members extending through said openings.*

*40. A decorated light assemblage as set forth in claim 37, wherein said decorating components include at least one decal that is secured to an exterior surface of said housing.*

*41. A decorated light assemblage as set forth in claim 37, wherein said decorating components include a plurality of decals, at least one of said decals having a different indicia thereon than another of said decals, each of said decals being secured to an exterior surface of said housing.*

*42. A decorated light assemblage as set forth in claim 37, wherein said decorating components include at least one indicia painted on an exterior surface of said housing.*

*43. A decorated light assemblage as set forth in claim 37, wherein said suspension members comprise cables.*

*44. A decorated light assemblage as set forth in claim 37, wherein said light assembly comprises a fluorescent bulb.*

*45. A decorated light assemblage as set forth in claim 37, wherein said overhead structure comprises a ceiling.*

*46. A decorated light assemblage as set forth in claim 38, wherein said decorating components include a plurality of decals, at least one of said decals having a different indicia thereon than another of said decals, each of said decals being secured to an exterior surface of said skirt.*

*47. A decorative housing arrangement for covering a light assembly, said decorative light housing arrangement comprising:*

*a decorative housing having a shape generally resembling a car, said housing being configured and arranged for being supported by an upper segment of said light assembly with an upper portion of said housing disposed above the light assembly, said housing including suspension element accommodating structure at said upper portion thereof; and*

*a plurality of decorating components carried on an outer surface of said decorative housing.*

*48. A decorative housing arrangement as set forth in claim 47 wherein said suspension element comprises an elongated suspension member and said suspension element accommodating structure comprises an opening for said suspension member.*

* * * * *